United States Patent
Kato et al.

(10) Patent No.: US 8,514,174 B2
(45) Date of Patent: Aug. 20, 2013

(54) SCREEN DISPLAY CONTROL DEVICE FOR DISPLAYING A HOME SCREEN AND NON-HOME SCREENS

(75) Inventors: Yasushi Kato, Tokyo (JP); Ikuomi Natori, Tokyo (JP)

(73) Assignee: TEAC Corporation, Tama-shi, Tokyo (JP)

( * ) Notice: Subject to any disclaimer, the term of this patent is extended or adjusted under 35 U.S.C. 154(b) by 404 days.

(21) Appl. No.: 12/749,181

(22) Filed: Mar. 29, 2010

(65) Prior Publication Data

US 2011/0115704 A1   May 19, 2011

(30) Foreign Application Priority Data

Nov. 18, 2009 (JP) ................. 2009-263269

(51) Int. Cl.
 G06F 3/033 (2013.01)
 G06F 3/00 (2006.01)
 G06F 3/048 (2013.01)
(52) U.S. Cl.
 USPC ............ 345/157; 715/713; 715/810; 715/847
(58) Field of Classification Search
 None
 See application file for complete search history.

(56) References Cited

U.S. PATENT DOCUMENTS

2004/0001098 A1 * 1/2004 Numano ................. 345/773
2008/0201665 A1 * 8/2008 Shimada ................. 715/847

FOREIGN PATENT DOCUMENTS

| EP | 1233599 A2 | * | 8/2002 |
| JP | 4207694 A | | 7/1992 |
| JP | 2003163742 A | | 6/2003 |
| JP | 2006101172 A | * | 4/2006 |
| JP | 2007249451 A | * | 9/2007 |

OTHER PUBLICATIONS

"Impact of 'handheld computer' to be soon used by hundreds of millions of people, iPhone and Android," Monthly Business ASCII, vol. 33, No. 10, 385th Issue, ASCII Media Works Inc., Japan, Oct. 1, 2009, 5 pages including excerpt in English.

Notice of Grounds for Rejection mailed Mar. 5, 2013, in counterpart JP Patent Application No. 2009-263269, 4 pages.

* cited by examiner

*Primary Examiner* — Alexander S Beck
*Assistant Examiner* — Kirk Hermann
(74) *Attorney, Agent, or Firm* — Seed IP Law Group PLLC

(57) ABSTRACT

There is disclosed a device which realizes a shortcut function without providing any key exclusively used for the shortcut function. When a home key is operated in a state where a lower screen at a lower position of a hierarchical structure is displayed, a home screen at an upper position of the hierarchical structure is displayed, and data to specify the lower screen when the home key is operated are stored in association with the home key. When the home key is operated in a state where the home screen is displayed, the lower screen is displayed based on the stored data to take a shortcut to the lower screen from the home screen.

6 Claims, 5 Drawing Sheets

SCREEN DISPLAY CONTROL DEVICE FOR DISPLAYING A HOME SCREEN AND NON-HOME SCREENS

PRIORITY INFORMATION

This application claims priority to Japanese Patent Application No. 2009-263269, filed on Nov. 18, 2009, which is incorporated herein by reference in its entirety.

BACKGROUND

1. Technical Field

The present invention relates to a screen display control device. More particularly, the invention relates to a device which controls screen display of a hierarchical structure.

2. Related Art

In various apparatuses, a home screen and a menu screen are usually present. Upon startup of the apparatus, the home screen is displayed as a screen of an uppermost hierarchy, and when keys are operated, various menu screens are displayed as screens of lower hierarchies. Moreover, when a home key is operated in a state where various menu screens of the lower hierarchies are displayed, the display can be returned from the screens to the home screen of the uppermost hierarchy.

In JP 2006-101172 A, a technology is disclosed in which when a check button of a regulation switch group is operated in a state where one of a plurality of hierarchized menu screens is displayed, the menu screen which is being displayed is stored as a shortcut menu in a memory. When a function button is depressed in a state where the menu screen is not displayed, a judgment is made as to whether or not the shortcut menu is stored in the memory. When the menu is stored, the menu screen stored in the memory is displayed. When the menu is not stored, the menu screen of the uppermost hierarchy is displayed.

Moreover, in JP 2007-249451 A, a technology is disclosed in which when a shortcut key is depressed, a judgment is made as to whether or not one of a plurality of sub-menu screens is being displayed. In a case where the judgment result is affirmative (the screen is being displayed), an identifier of the sub-menu screen which is being displayed is registered as a shortcut menu in a table. When the judgment result is negative (the screen is not displayed), a selection screen of the shortcut menus is displayed.

When a specific screen is assigned to this shortcut key and this shortcut key is depressed in a state where an arbitrary screen is displayed, the display can immediately shift to the specific screen, which improves the user's operability. However, the shortcut key needs to be newly provided in the apparatus. In recent years, the miniaturization of the apparatus and the high function thereof have further advanced, and it has been demanded that various operation keys be arranged in a limited space and that a shortcut function be realized without providing any special key such as the shortcut key. Furthermore, if a key exclusively used for the shortcut function; for example, the shortcut key or the like, is provided in the apparatus, the key is not useless for a user who does not often use the function.

SUMMARY

According to the present invention, there are provided a device and an apparatus which can simply realize a shortcut function without providing any key exclusively used for the shortcut function.

The present invention is a screen display control device which displays a home screen and a plurality of non-home screens of hierarchies lower than the hierarchy of the home screen, the device comprising: means for displaying the home screen, and storing an identifier to specify the non-home screen when a home key is operated in a state where the non-home screen is displayed; and means for displaying the non-home screen specified by the stored identifier when the home key is operated in a state where the home screen is displayed.

Moreover, according to the present invention, there is provided a screen display control device which successively displays screens of a hierarchical structure in a display unit, the device comprising: home screen display means for displaying a home screen at an upper position of the hierarchical structure, when a home key is operated in a state where a lower screen at a lower position of the hierarchical structure is displayed; storage means for associating and storing, with the home key, data to specify the lower screen when the home key is operated; and control means for displaying the lower screen based on the data stored in the storage means to take a shortcut to the lower screen from the home screen, when the home key is operated in a state where the home screen is displayed.

Moreover, according to the present invention, there is provided an electronic apparatus comprising: a home key; a display unit; and the above screen display control device which displays a screen in the display unit in accordance with the operation of the home key.

According to the present invention, the home key can also be used as a key having a shortcut function. Therefore, it is not necessary to newly provide a key exclusively used for the shortcut function. Moreover, in the present invention, the home key executes the shortcut function in the home screen, which can increase a utilization efficiency of the home key.

The present invention will be described by reference to the following embodiment, in order to further clarify the invention. However, the following embodiment is merely an illustration, and the scope of the present invention is not limited to the following embodiment.

DETAILED DESCRIPTION

Hereinafter, with reference to the drawings an embodiment of the present invention will be described with respect to a portable digital recorder serving as an example of an electronic apparatus.

Figure 1:
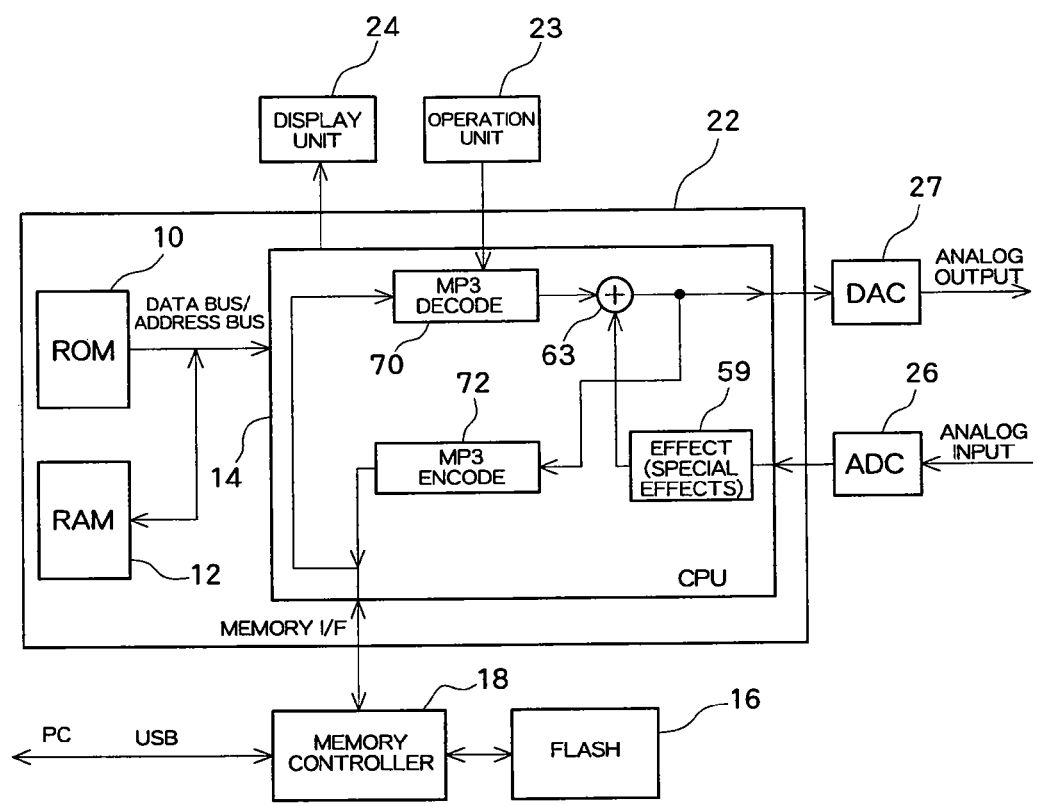
FIG. 1 is a constitution block diagram of an apparatus in an embodiment.

FIG. 1 shows a constitution block diagram of a digital recorder in the present embodiment. The digital recorder comprises a flash memory 16 in which audio data encoded and compressed in an MP3 format are stored. The MP3 audio data stored in the flash memory 16 are read out by a memory controller 18 and supplied to a digital data processing circuit 22. A device which reproduces the audio data encoded in MP3 is known as an MP3 player.

The digital data processing circuit 22 comprises an ROM 10, an RAM 12, and a CPU 14. The CPU 14 comprises an effect processing section 59, a digital data synthesis section 63, an MP3 decode section 70, and an MP3 encode section 72. The MP3 decode section 70 and the MP3 encode section 72 may be constituted of hardware circuits for exclusive use, or of software. Moreover, the effect processing section 59 and the digital data synthesis section 63 are necessary during mixing processing, but these members are not necessarily required when voice data are simply recorded.

The MP3 audio data read out of the flash memory 16 by the memory controller 18 are supplied to the MP3 decode section 70 of the CPU 14. The MP3 decode section 70 decodes the MP3 audio data to supply the data to the digital data synthesis section 63. Decode processing in the MP3 decode section 70 is executed in accordance with an MP3 decode program included as a subroutine in a system program stored beforehand in the ROM 10. The decoded audio data are further supplied to the digital data synthesis section 63 in response to an operation signal from an operation unit 23.

Moreover, the voice data input from a directional or omnidirectional microphone provided at a predetermined position of the digital recorder are converted into digital data by an ADC 26, and then supplied to the digital data processing circuit 22. The CPU 14 of the digital data processing circuit 22 subjects the data to effect processing by the effect processing section 59 in response to the operation signal from the operation unit 23 to supply the data to the digital data synthesis section 63. The digital data synthesis section 63 synthesizes the decoded audio data and the voice data subjected to the effect processing to supply the data to a DAC 27, and the data are converted into an analog signal by the DAC 27 and output to the outside. In consequence, the MP3 audio data are synthesized with external voice data and output, whereby a user plays a musical instrument or the like in accordance with, for example, a reproduction audio signal, and the data can be mixed and reproduced. The synthesized data from the digital data synthesis section 63 may be output to the DAC 27 and supplied to the MP3 encode section 72. When the mixing processing is not performed, the voice data input from the microphone are converted into the digital data by the ADC 26 and supplied to the MP3 encode section 72.

The MP3 encode section 72 encodes the voice data or the synthesized data in the case of the mixing in an MP3 system, and the encoded data are stored in the flash memory 16. The encode processing in the MP3 encode section 72 is executed in accordance with an MP3 encode program included as a subroutine in the system program stored beforehand in the ROM 10 in the same manner as in the MP3 decode section 70.

It is to be noted that the recording of sound in the MP3 format is one example, and the sound may be recorded in another format such as a wav format. Moreover, the sound may be recorded in one of the MP3 format and the wav format in accordance with the operation of the operation unit 23 by the user. Moreover, the voice data input from the directional or omnidirectional microphone may be stereo-recorded in two channels.

The digital recorder can be connected to an external computer (PC) via USB, and the flash memory 16 can be accessed from the external PC via the memory controller 18. That is, when the recorder is connected to the PC, the flash memory 16 is recognized as a USB mass storage device, and file forwarding, copying, file name change, deletion, and the like can be performed by use of the PC.

In a display unit 24, various screens indicating the state of the digital recorder are displayed. Specifically, examples of the screens include a home screen as the screen of an uppermost hierarchy and various menu screens as screens of lower hierarchies. The various menu screens include a function menu screen for setting the function of the digital recorder. The user operates the operation unit 23 to display the screen necessary for the operation of the digital recorder in the display unit 24. That is, in response to the operation signal from the operation unit 23, the CPU 14 displays, on the display unit 24, the screen corresponding to the operation signal in accordance with the system program stored beforehand in the ROM 10.

Figure 2:
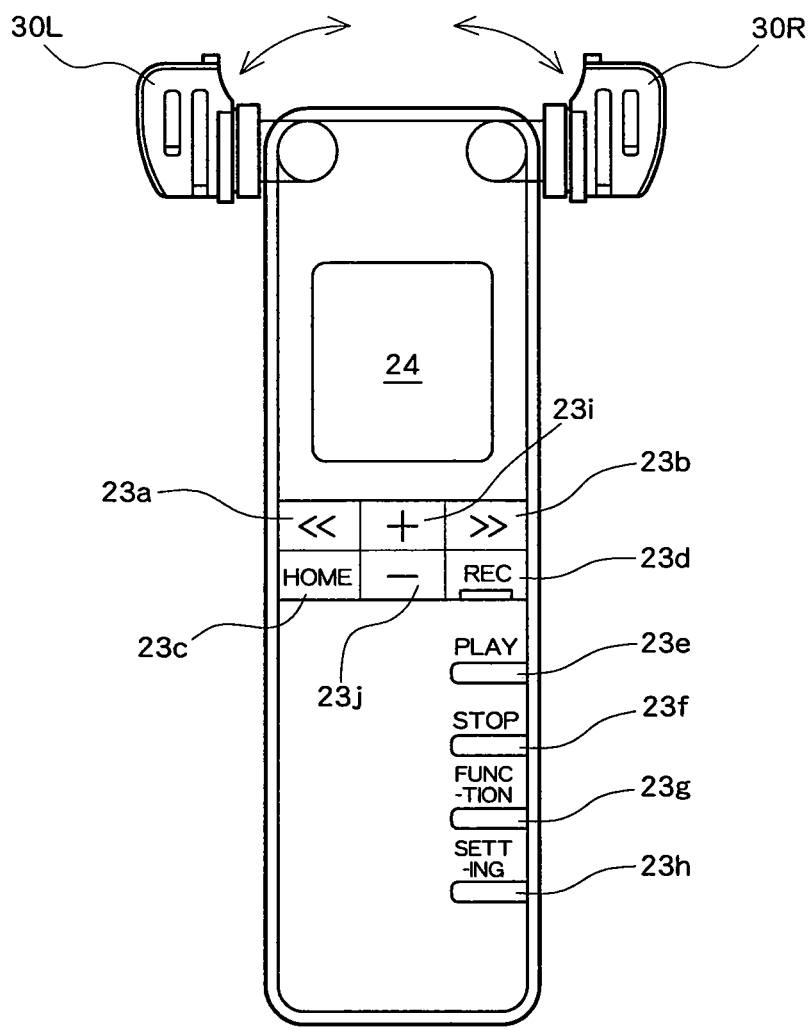
FIG. 2 is a plan view of an apparatus in the embodiment.

FIG. 2 shows an appearance diagram (a plan view) of the digital recorder. In an upper part of the digital recorder, directional microphones 30R, 30L for stereo sound recording are provided on the left and right sides. The pair of microphones 30R, 30L are supported rotatably around a rotary shaft, and can be rotated in the directions indicated by arrows in the drawing. That is, the microphone 30R can rotate as much as about 90 degrees from its illustrated position in a counterclockwise direction, and the microphone 30L can rotate as much as about 90 degrees from its illustrated position in a clockwise direction.

In addition to a power switch (not shown), the operation unit 23 is provided with a rewind key 23a, a fast forward key 23b, a home key 23c, a sound recording (Rec) key 23d, a reproduction (play) key 23e, a stop key 23f, a function key 23g, a setting key 23h, a plus (+) key 23i, and a minus (−) key 23j.

The home key 23c is a key for displaying a home screen of an uppermost hierarchy on the display unit 24. When the power switch of the digital recorder is turned on to start the digital recorder, the CPU 14 first displays the home screen on the display unit 24. Moreover, when the user depresses the home key 23c in a state where an arbitrary lower hierarchy screen other than the home screen is displayed on the display unit 24, the CPU 14 displays the home screen on the display unit 24 again.

The function key 23g is a key for displaying the function menu screen of the lower hierarchy on the display unit 24. In the function menu screen, the user displays a list of various functions of the digital recorder so that the user selects an arbitrary function. A function menu includes a repeat function, a folder/file function, a reproduction speed function, a file dividing function, a file deleting function, and the like.

The setting key 23h is a key for displaying a setting menu screen of the lower hierarchy on the display unit 24. The setting menu screen displays the ON/OFF setting of a digital recorder sound recording mode or a timer, the ON/OFF setting of a speaker, or the like.

In such a constitution, there is assumed a case where the user regulates a reproduction speed to a desired speed. In this case, the user starts the digital recorder to display the home screen on the display unit 24, and then depresses the function key 23g to display the function menu screen. Moreover, the user selects the reproduction speed from the function menu, and regulates the parameter of the reproduction speed in a reproduction speed screen. After completing the regulation of the reproduction speed, the user depresses the home key 23c to display the home screen in the display unit 24, and then depresses the reproduction key 23e to reproduce a desired tune.

On the other hand, when the user desires to regulate the reproduction speed again after reproducing the tune, in a conventional method, the user depresses the function key 23g in the home screen again to display the function menu screen, and then selects the reproduction speed screen to regulate the parameter, which complicates the operation. A shortcut key may be provided to assign the reproduction speed screen to the shortcut key, but the shortcut key needs to be newly provided, and it is sometimes difficult to provide the new key in the portable digital recorder having a limited size.

To solve the problem, in the present embodiment, the shortcut key is not newly provided, but attention is focused on the home key 23c, and the home key 23c is also used as the shortcut key. That is, the home key 23c intrinsically has a function of shifting to the home screen when the home key is depressed in a screen other than the home screen, but the home key 23c is provided beforehand with a function of shifting to a screen assigned as a shortcut screen, when the key is depressed in the home screen.

Figure 3:
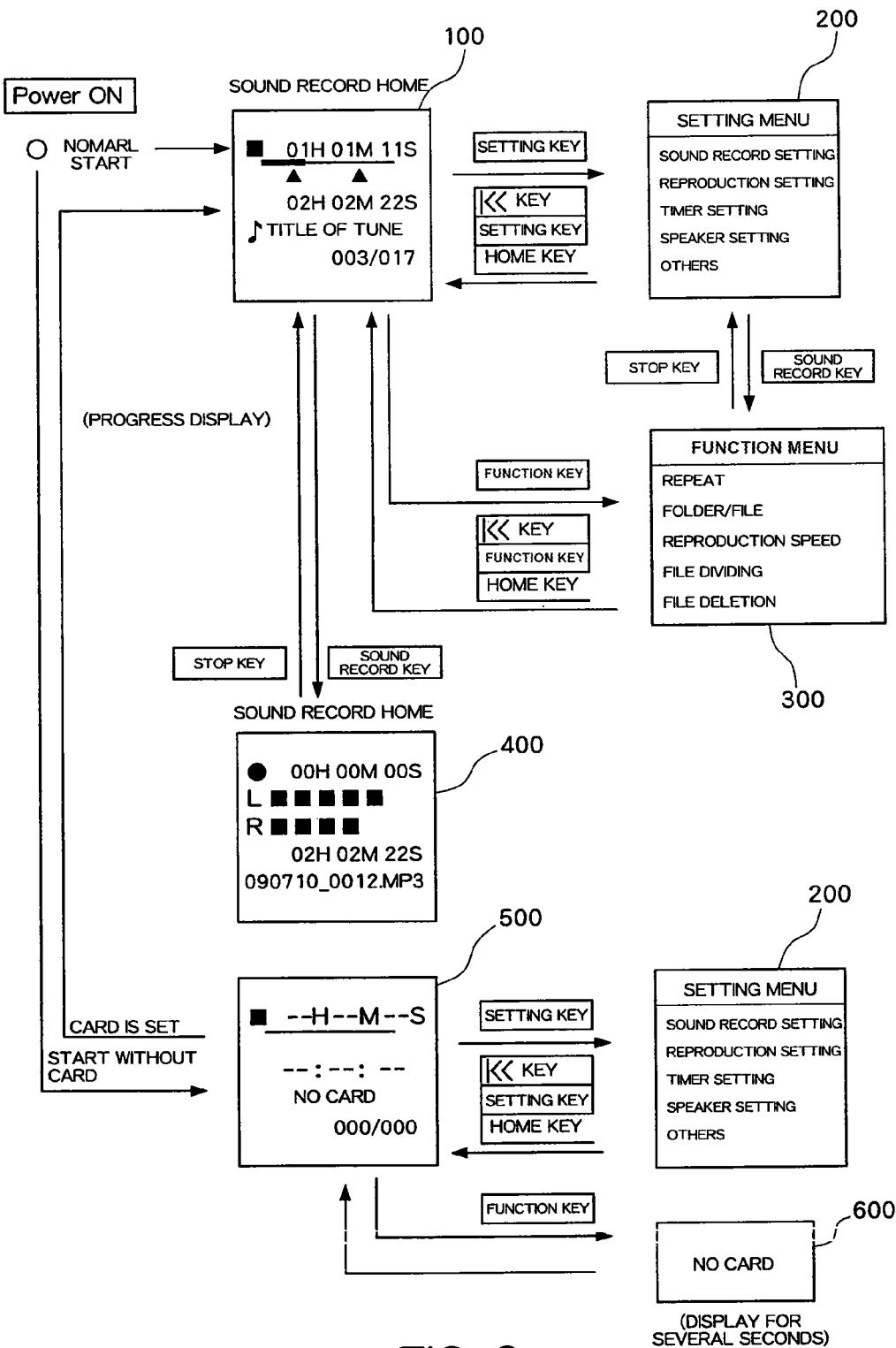
FIG. 3 is an explanatory view of screen transition of the embodiment.
Figure 4:
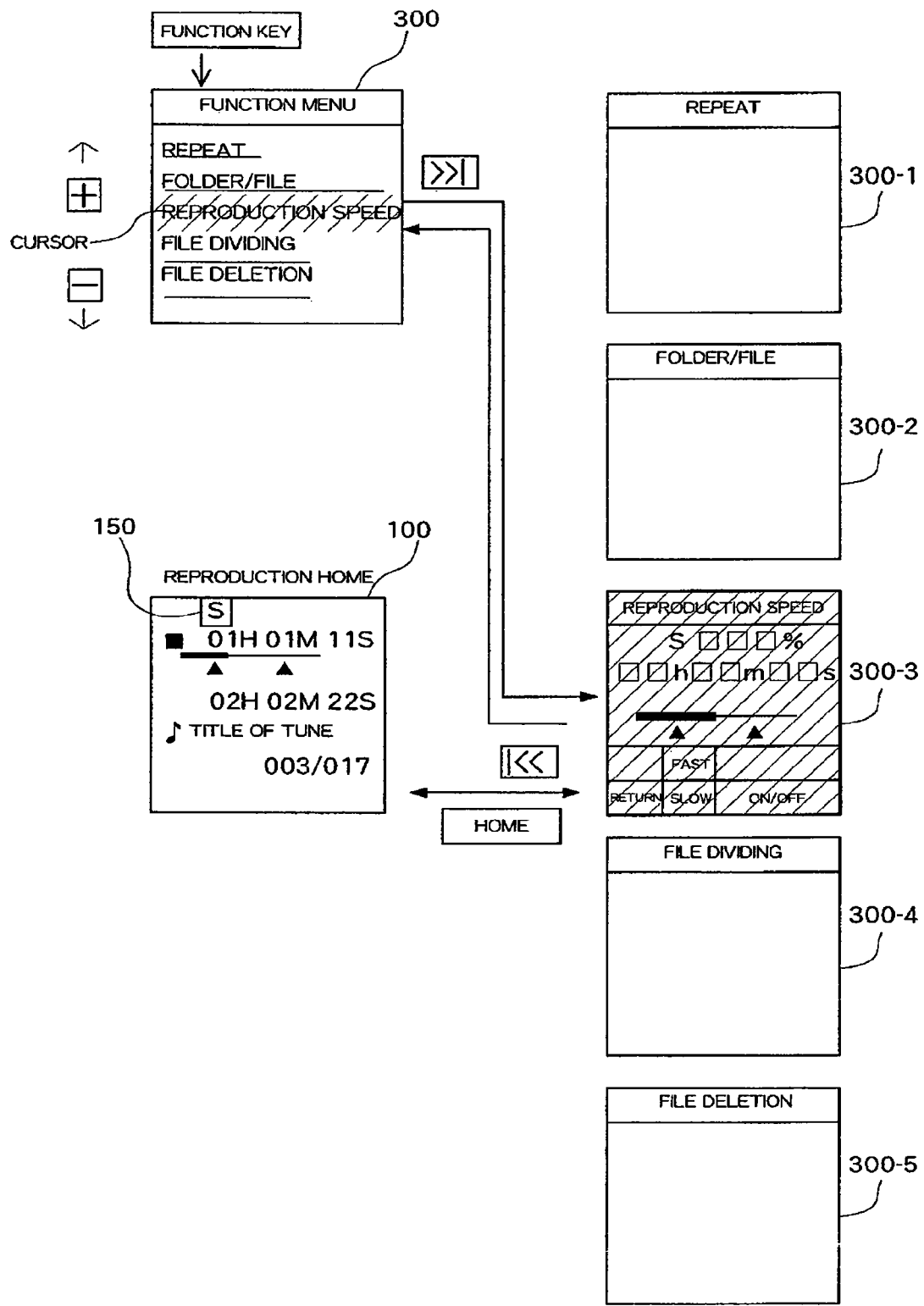
FIG. 4 is an explanatory view of the screen transition of the embodiment.

FIGS. 3 and 4 show screen transition in the present embodiment. First, in FIG. 3, when the user turns on the power switch (Power ON) and the screen normally starts, a home screen (the home screen for the reproduction) 100 of the uppermost hierarchy is displayed on the display unit 24. It is to be noted that in the home screen 100 for the reproduction started at this time, a reproduction time, a remaining time, the title of the tune which is being reproduced, and the like are displayed.

When the user depresses the setting key 23h in a state where the home screen 100 is displayed, a setting menu screen 200 is displayed on the display unit 24. In the setting menu screen 200, sound record setting, reproduction setting, timer setting, speaker setting, and other setting items are displayed. When the user depresses the rewind key 23a, the setting key 23h, or the home key 23c in a state where the setting menu screen 200 is displayed, the display returns to the home screen 100 again.

Moreover, when the user depresses the function key 23g in a state where the home screen 100 is displayed on the display unit 24, a function menu screen 300 is displayed on the display unit 24. In the function menu screen 300, functions such as repeat, folder/file, reproduction speed, file dividing, and file deletion are displayed. When the user depresses the rewind key 23a, the function key 23g, or the home key 23c in a state where the function menu screen 300 is displayed, the display returns to the home screen again. It is to be noted that even when the user depresses the function key 23g in a state where the setting menu screen 200 is displayed, the function menu screen 300 is displayed. When the setting key 23h is depressed in a state where the function menu screen 300 is displayed, the setting menu screen 200 is displayed.

Moreover, when the user depresses the sound recording key 23d in a state where the home screen 100 is displayed on the display unit 24, a home screen 400 for the sound recording is displayed on the display unit 24, and the sound recording of the voice data is started. In the home screen 400 for the sound recording, a sound recording time, a sound recording level, a file name, and the like are displayed. When the user depresses the stop key 23f in a state where the home screen 400 for the sound recording is displayed, the display returns to the home screen 100.

On the other hand, when the user depresses the power switch to start the digital recorder in a state where no card of the flash memory 16 is connected to the digital recorder, an error screen 500 is displayed on the display unit 24. When the user connects the card of the flash memory 16 in this state, it is judged that the digital recorder normally starts, and the home screen 100 is displayed on the display unit 24. When the user depresses the setting key 23h in a state where the error screen 500 is displayed, the setting menu screen 200 is displayed. On the other hand, when the user depresses the function key 23g, an error screen 600 indicating a message "no card is connected" is displayed.

Next, with reference to FIG. 4, there will be described screen transition in a case where the home key 23c is also used as the shortcut key.

In FIG. 4, when the user depresses the function key 23g in a state where the home screen 100 is displayed, the function menu screen 300 is displayed as described above. In this state, when the user depresses the plus key 23i or the minus key 23j to arbitrarily select an item of the function menu (e.g., moves a cursor to a desired item), and depresses the fast forward key 23b, a setting screen of the selected item; that is, one of setting screens 300-1 to 300-5 of the items, is displayed on the display unit 24. Here, a repeat screen 300-1, a folder/file screen 300-2, a reproduction speed screen 300-3, a file dividing screen 300-4, and a file deletion screen 300-5 are shown. As one example, in the reproduction speed screen 300-3, items of the present reproduction speed, fast, slow, and on/off are displayed.

When the user depresses the rewind key 23a in a state where this screen is displayed, the display returns to the function menu screen 300. When the home key 23c is depressed, the display returns to the home screen 100. At this time, the CPU 14 detects that the home key 23c has been depressed in the screen other than the home screen 100, stores an identifier of the screen when the home key 23c has been depressed, and registers the shortcut screen. Specifically, the identifier of the reproduction speed screen is set to a flag for a shortcut function.

When the display returns to the home screen 100 and the user depresses the home key 23c in the home screen 100, the CPU 14 detects that the home key 23c has been depressed in the home screen 100, and refers to a value of the flag for the shortcut function so that the home key 23c functions as the shortcut key. Moreover, the identifier of the shortcut screen is acquired with reference to the value of the flag, and the screen specified by the identifier; that is, in this case the reproduction speed screen 300-3 is displayed on the display unit 24. Therefore, when the user simply depresses the home key 23c in the home screen 100, the display can immediately shift to the reproduction speed screen 300-3. The home key 23c is intrinsically a key which functions in the screen other than the home screen 100 and which is not used in the home screen 100. In the present embodiment, attention is focused on this concept, and the home key 23c is allowed to function as the shortcut key in the home screen 100. It can be considered that the home key 23c in the home screen 100, which has heretofore not been used, is allowed to function as an effective key. The home key 23c has an intrinsic function (of returning to the home screen 100) in the screen other than the home screen 100, and is allowed to function as the shortcut. key for immediately shifting to the registered screen in the home screen 100, whereby the shortcut function can be realized without adding any new key. Furthermore, the home key 23c, which has not been used in the home screen 100, can be effectively utilized.

It is to be noted that the flag of the shortcut function is rewritable, and is rewritten into the identifier of the latest screen, when the identifier of the screen is registered in the flag and then the home key 23c is depressed in another screen. For example, when the home key 23c is depressed in the reproduction speed screen 300-3, the identifier of the reproduction speed screen 300-3 is registered in the flag of the shortcut function. Afterward, when the home key 23c is depressed in the repeat screen 300-1, the identifier of the repeat screen 300-1 is newly registered in the flag of the shortcut key function.

In this way, the value of the flag can be rewritten, and hence it is assumed that when the user depresses the home key 23c in various screens, the screen registered as the shortcut screen becomes unclear. Therefore, when the identifier of the screen is registered in the flag of the shortcut function, a certain eye mark or mark for specifying the screen is preferably displayed beforehand on the home screen 100. For example, in FIG. 4, a mark 150 of 'S' indicating the reproduction speed screen 300-3 is displayed on the home screen 100. The user visually recognizes the home screen 100, whereby he or she can easily recognize that the reproduction speed screen 300-3 is registered as the shortcut screen in the home key 23c at present. Needless to say, this eye mark 150 is set uniquely for each screen. The repeat screen 300-1 is indicated by 'R,' and the folder/file screen 300-2 is indicated by 'F.'

Moreover, the flag of the shortcut function may be stored in the RAM 12, but can be stored in the ROM 10. When the flag is stored in the ROM 10 and the power switch of the digital recorder is turned off, the value of the flag is retained. Next, even after the power switch is turned on, the shortcut can be realized.

Figure 5:
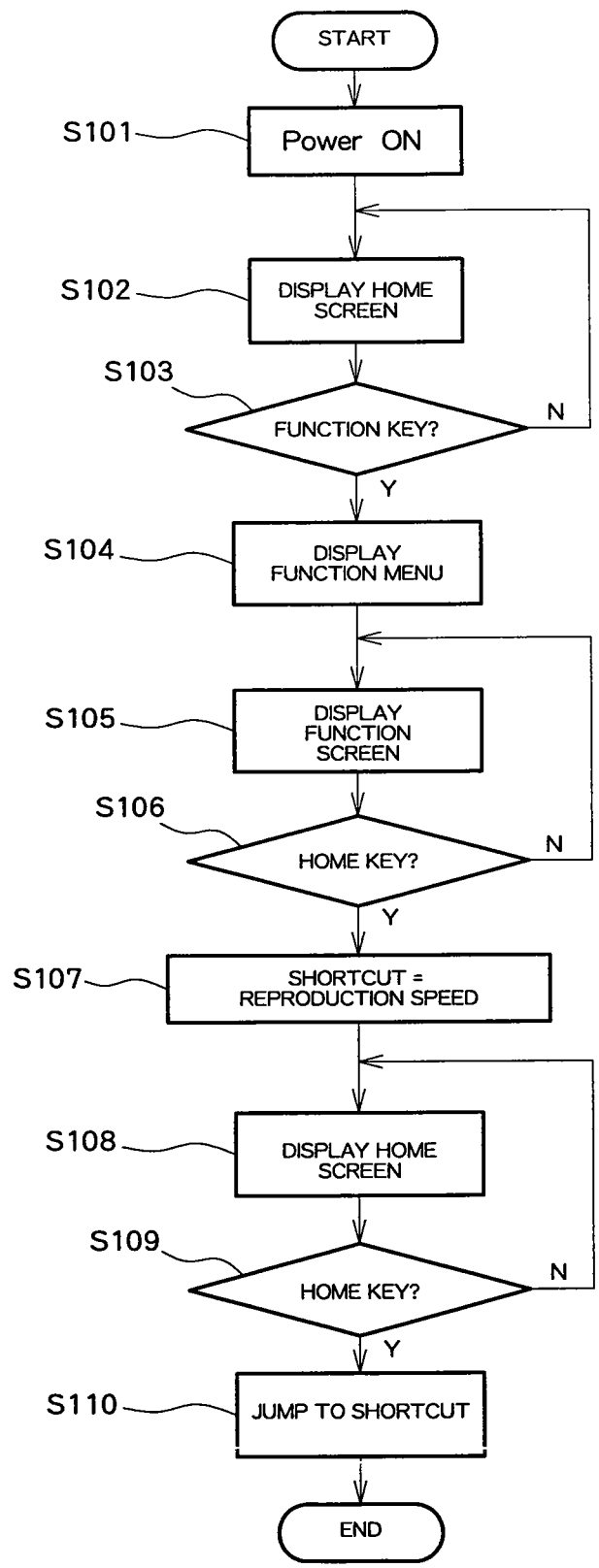
FIG. 5 is a processing flow chart of the embodiment.

FIG. 5 shows a processing flow chart of the present embodiment. First, when the user turns on the power switch (S101), the CPU 14 displays the home screen 100 of the uppermost hierarchy in accordance with a program (S102). It is to be noted that when the card of the flash memory 16 is not connected, the error screen (the screen indicating that no card is connected) 500 is displayed instead of the home screen 100 as described above.

When the user depresses the function key 23g in a state where the home screen 100 is displayed (YES in S103), the CPU 14 displays the function menu screen 300 of the lower hierarchy (S104). Moreover, the function item is selected by the plus key 23i or the minus key 23j, and the fast forward key 23b is depressed to display one of the screens 300-1 to 300-5 of the respective function items (S105). The user appropriately selects the screen to set the function.

Next, the CPU 14 judges whether or not the home key 23c has been depressed in these screens 300-1 to 300-5 (S106). When the user depresses the home key 23c in, for example, the reproduction speed screen 300-3, the CPU 14 sets the identifier of the reproduction speed screen 300-3 to a shortcut function flag Shortcut in response to this key (S107). Then, the home screen 100 is displayed on the display unit 24 (S108).

Next, the CPU 14 judges whether or not the home key 23c has been depressed in the home screen 100 (S109). When the user depresses the home key 23c, the CPU 14 displays the screen specified by the identifier set to this flag (in this case, the reproduction speed screen 300-3) with reference to the value of the flag Shortcut in response to this key (S110). It is to be noted that the identifier of the home screen 100 is set as a default to the flag Shortcut, whereby, when the home key 23c is depressed in the home screen 100 (S102) just after the start, the home screen 100 continues to be displayed.

It is to be noted that after the home key 23c is depressed in the home screen 100 to immediately shift to the reproduction speed screen 300-3, the user shifts to another screen, such as the repeat screen 300-1, and depresses the home key 23c in the repeat screen 300-1. In response to the key, the CPU 14 newly sets the identifier of the repeat screen 300-1 to the flag Shortcut. That is, the value of the flag Shortcut is overwritten. Therefore, when the user depresses the home key 23c in the home screen 100 again after shifting to the home screen 100, the display does not shift to the reproduction speed screen 300-3, but shifts to the repeat screen 300-1.

In this way, according to the present embodiment, when the home key 23c is depressed, this depressing is regarded as a trigger to automatically register the screen when the home key 23c is depressed as the shortcut screen, which obviates the need for a separate key for registering the shortcut screen. Moreover, when the home key 23c is depressed in the home screen 100, the display immediately shifts to the already registered screen, which obviates the need for a separate key for executing the shortcut. Furthermore, the home key 23c, which is intrinsically not used in the home screen 100, is allowed to function as the shortcut key, whereby the home key 23c can be effectively utilized. It is to be noted that in the present embodiment, the home key 23c has three functions:

(1) a function of returning to the home screen 100;
(2) a function of registering the shortcut screen; and
(3) a function of executing the shortcut.

The embodiment of the present invention has been described above, but the present invention is not limited to this embodiment, and various alterations can be achieved. For example, in the present embodiment, the digital recorder has been described as an example of the apparatus, but the apparatus is not limited to the digital recorder, and the present invention can be applied to an audio device, an information apparatus, a terminal apparatus, a communication apparatus, and the like. Moreover, in the present embodiment, the home key 23c is a key which can be depressed, but the type of the key is arbitrary, and a touch switch or the like may be used.

Moreover, in the present embodiment, the value of the flag Shortcut can be rewritten (can be overwritten), but a plurality of identifiers may be set. For example, two identifiers; that is, the previous identifier and the present identifier, can be set. In this case, when the home key 23c is depressed once in the home screen 100, the display shifts to a screen registered just before. When the home key 23c is depressed continuously twice (double clicked), the display can shift to a screen registered before the previous screen.

Furthermore, in the present embodiment, the identifier is set to the flag Shortcut, but the identifier is one example of information for specifying the screen, and arbitrary data for uniquely specifying the screen below the home screen 100 in the hierarchical structure can be set to the flag. Moreover, the flag is not necessarily essential. In short, data for uniquely specifying the screen below the home screen 100 in the hierarchical structure in association with the home key 23c may be stored in the ROM 10 or the RAM 12.

What is claimed is:

1. A screen display control device which displays a home screen and a plurality of non-home screens in hierarchies lower than a hierarchy of the home screen, the device comprising:
    a storage section configured to store an identifier to specify one of the non-home screens, when a home key is operated in a state where the one of the non-home screens is displayed, in which the home key need only be operated once; and
    a display section configured to display the home screen when the home key is operated in the state where the one of the non-home screens is displayed, and to display the one of the non-home screens specified by the stored identifier when the home key is operated in a state where the home screen is displayed.

2. The device according to claim 1, wherein the plurality of non-home screens comprises at least a first non-home screen and a second non-home screen, and
    the display section is configured to display the home screen and the storage section is configured to store an identifier to specify the first non-home screen, when the home key is operated in a state where the first non-home screen is displayed, and the display section is configured to display the home screen and the storage section is configured to store an identifier to specify the second non-home screen instead of the identifier to specify the first non-home screen, when the home key is operated in a state where the second non-home screen is displayed.

3. The device according to claim 1, wherein the display section is configured to display a mark indicative of the identifier in the home screen, when the storage section stores the identifier.

4. A screen display control device which successively displays screens of a hierarchical structure in a display unit, the device comprising:
- a storage section configured to associate and store, with a home key, data to specify a lower screen when the home key is operated, in which the home key need only be operated once; and
- a display control section configured to display a home screen at an upper position of the hierarchical structure, when the home key is operated in a state where the lower screen at a lower position of the hierarchical structure is displayed, and to control displaying the lower screen based on the data stored in the storage section to take a shortcut to the lower screen from the home screen, when the home key is operated in a state where the home screen is displayed.

5. An electronic apparatus comprising:
a home key;
a display unit; and
a screen display control device configured to display a screen in the display unit in accordance with an operation of the home key,
wherein the screen display control device is further configured to display in the display unit a home screen and a plurality of non-home screens in hierarchies lower than a hierarchy of the home screen, and the screen display control device comprises:
- a storage section configured to store an identifier to specify one of the non-home screens, when the home key is operated in a state where the one of the non-home screens is displayed, in which the home key need only be operated once; and
- a display section configured to display in the display unit the home screen when the home key is operated in the state where the one of the non-home screens is displayed, and to display in the display unit the one of the non-home screens specified by the stored identifier when the home key is operated in a state where the home screen is displayed.

6. An electronic apparatus comprising:
a home key;
a display unit; and
a screen display control device configured to display a screen in the display unit in accordance with an operation of the home key,
wherein the screen display control device is further configured to successively display screens of a hierarchical structure in the display unit, and the screen display control device comprises:
- a storage section configured to associate and store, with the home key, data to specify a lower screen when the home key is operated, in which the home key need only be operated once; and
- a display control section configured to display in the display unit a home screen at an upper position of the hierarchical structure, when the home key is operated in a state where the lower screen at a lower position of the hierarchical structure is displayed, and to control displaying in the display unit the lower screen based on the data stored in the storage section to take a shortcut to the lower screen from the home screen, when the home key is operated in a state where the home screen is displayed.

* * * * *